Dec. 9, 1969  B. L. JORDAN  3,482,613
TIMBER SHEAR
Filed Jan. 8, 1968  2 Sheets-Sheet 1
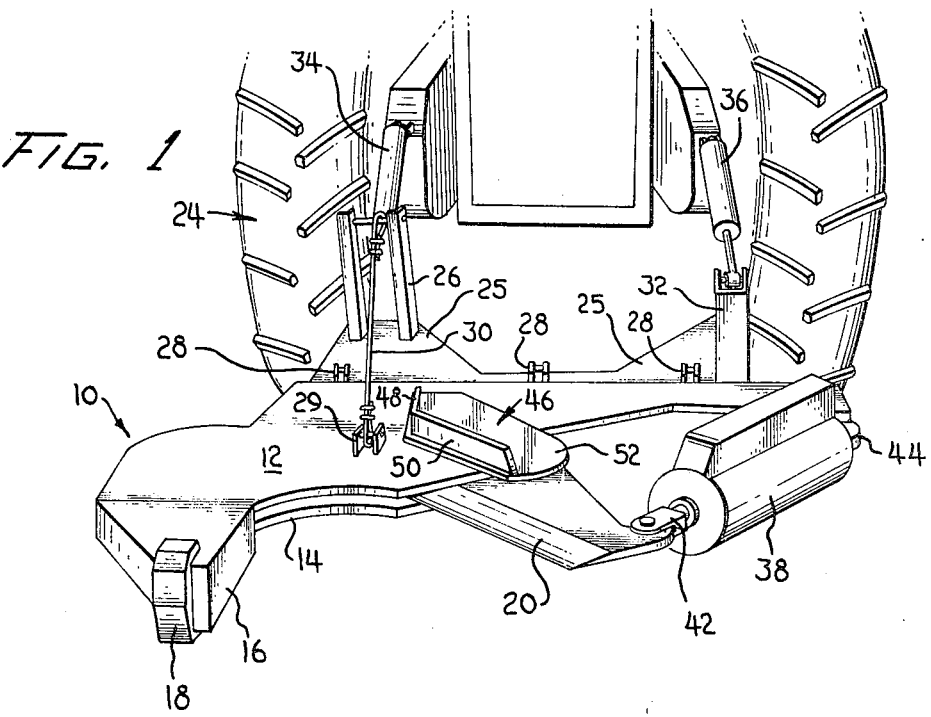
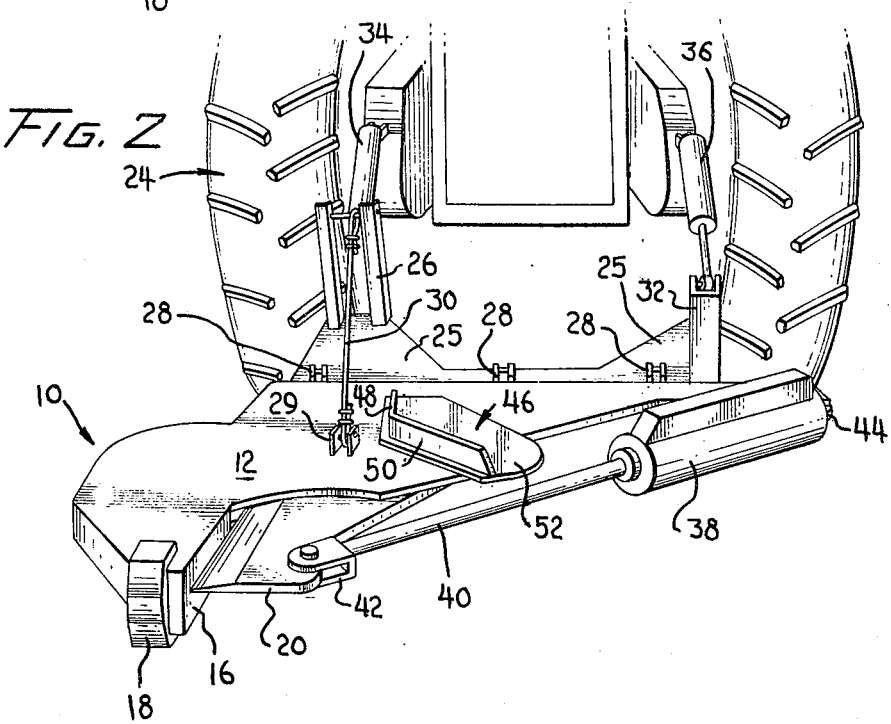

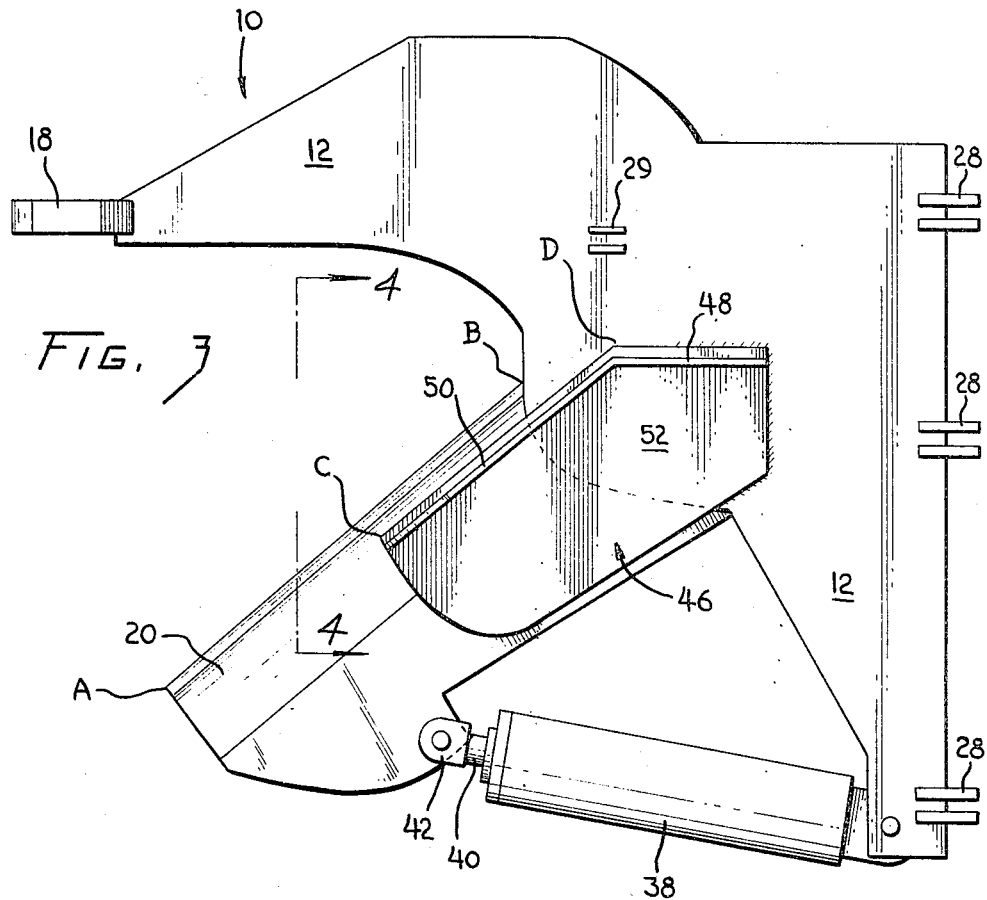
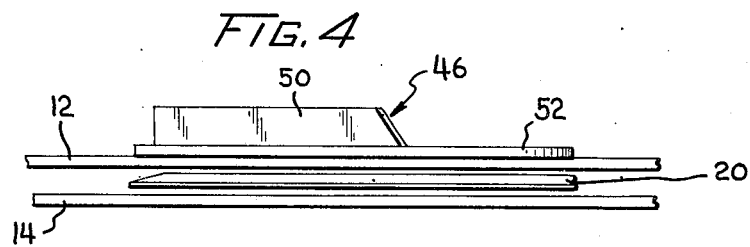

United States Patent Office 3,482,613
Patented Dec. 9, 1969

3,482,613
TIMBER SHEAR
Bertram L. Jordan, Lewiston, N.C., assignor to Harrington Manufacturing Company
Filed Jan. 8, 1968, Ser. No. 696,228
Int. Cl. B27m 1/00
U.S. Cl. 144—34                                       6 Claims

ABSTRACT OF THE DISCLOSURE

This invention pertains to an improved tree shear device which is provided with means for facilitating the dislodgement of the tree shear blade in the event that it becomes stuck in a tree.

BACKGROUND

A number of different tree shear devices have been proposed during the past 15 or 20 years. Until very recently these timber shear devices have not enjoyed any great degree of success, primarily because each shear device that has been developed has suffered from at least one rather serious drawback.

Meece et al. Patent No. 3,327,745 illustrates the basic arrangement for what is believed to be the most widely used tree shear now available to industry. As can be seen from a review of this patent, such tree shears generally involve a fixed jaw unit, a movable blade which is adapted to move through a limited arc, and means for moving the blade through the limited arc.

One of the difficulties that is sometimes encountered with tree shear units of this type is that the blade may become so tightly lodged within the trunk of the tree that it becomes difficult, or sometimes even impossible, to remove. In particular, this difficulty is most frequently encountered when the operator of the tree shear device attempts to cut down a tree having a diameter larger than the manufacturer of the shear recommends for cutting. For instance, sometimes a manufacturer designs a tree shear device so that it will only cut trees having a diameter of less than 24 inches, but the workman assigned to operate the machine will neverthelee.ss often try (through inadvertence or miscalculation) to cut down a 30 inch tree. The operation of the tree shear is sometimes able to cut down the 30 inch tree despite the manufacturer's stated limitations for the tree shear because, before the blade has passed completely through the tree, the tree will begin to topple over and since the tree falls away from the blade, it does not bind it. However, sometimes large trees will not begin to topple until completely severed, and in such instances the blade can become firmly stuck in the tree trunk. Operators can sometimes dislodge the stuck blade by wiggling, shaking or otherwise moving the tractor unit carrying the tree shear device. However, this is not always possible and when a blade becomes firmly stuck in a tree it is usually necessary for the operator to terminate the tree shearing operation and manually cut down the tree in order to free the stuck blade. Sometimes the tree shear blade is broken or damaged or sometimes other parts of the overall tree shear unit are broken or damaged in an attempt to free the blade.

THE PRESENT INVENTION

The aforesaid problems associated with a stuck blade are obviously difficult to deal with and it is the primary objective of this invention to avoid the possibility of breaking or damaging the tree shear blade or associated equipment in an effort to free the stuck blade. More particularly, the object of this invention is to provide a modified jaw member which will permit easy withdrawal of the blade anytime that it becomes stuck in a tree. These and other objects and advantages will become apparent after reading the following description in conjunction with the attached drawings, wherein:

FIGURE 1 is a perspective view of an open-bladed tree shear unit containing the novel features of this invention;
FIGURE 2 is a view similar to FIGURE 1, except that the blade is closed;
FIGURE 3 is a plan view illustrating the invention;
FIGURE 4 is a fragmentary sectional view along 4—4 of FIGURE 3.

The present invention will be illustrated with the reference to a timber shear unit which is quite similar in operation to the type of timber shear that is currently being manufactured (under the name Roanoke TF 1, 2, 4 and 10) by the Harrington Manufacturing Company of Lewiston, N.C. The basic construction of the timber shear unit includes, in addition to a tractor 24, a supporting framework 25 attached to the tractor; hydraulic cylinders 34 and 36 for raising and lowering the supporting framework (with the aid of upstanding posts 26 and 32 located on the supporting framework); a jaw section 10 composed of an upper jaw member 12 and a lower jaw member 14, a nose section 18; the jaw section 10 being attached to the supporting framework 25 by means of a plurality of pivoted connectors 28; a cable 30 or equivalent flexible interconnecting means which serves to interconnect an anchor point 29 on the jaw section 10 and the post 26; and a plate 16 which bridges the upper and lower jaw plates 12 and 14.

Associated with the jaw section 10 is a shear blade 20. This shear blade is pivoted at its inner end so that it is free to move through a limited arc from an open position (FIGURE 1) to a closed position (FIGURE 2). The blade is moved through the arc by a hydraulic-cylinder means 38, one end 42 of which is attached to the outer end of the shear blade and the other end 44 of which is attached to the jaw section 10 or to another portion of the timber shear unit. Further specific details of the construction and operation of timber shear units of the types shown in the drawings and described above can be obtained by reading Meece et al. Patent 3,327,745; or by looking at the aforesaid commercially available Harrington Roanoke TF-1 and TF-10 tree shear units.

Now turning to those features of the present invention which distinguish over what has gone before, it will be noted that upper jaw plate 12 has mounted on it an outwardly extending member 46. The outwardly extending member 46 is shown as basically comprising an oblong flat metal plate 52 that is disposed in a plane that is substantially parallel to the plane of the shear blade 20 (which of course means that it is also substantially parallel to the plane of the jaw section 10). A reinforcing strip of metal (consisting of sections 48 and 50) may be welded to the top of member 52 in order to lend strength and rigidity. The bottom part of plate 52 may be directly welded to the top of the upper jaw plate 12 (as is shown in FIGURE 4), or if the blade is to have guide members of the type used on currently sold Roanoke TF-1 and TF-10 Tree Shears, then the plate 52 of the extension member 46 may be spaced upwardly above the upper jaw plate 12 by means of one or more spacer members.

In FIGURE 3 the angular disposition of the leading (i.e. cutting) edge (A–B) of the shear blade 20 when the shear blade is in its "open" position can be noted. Preferably, the leading or front edge C–D of the extension member 46 is disposed slightly behind the leading edge A–B of the shear blade member 20 (as is evident from FIGURE 3). The reason for this is so that when the timber shear unit is maneuvered near to a tree to begin the cutting operation, the tree trunk will first be contacted and actually loosely gripped between the leading edge A-B of the shear blade and the opposing side of jaw section 10 (and especially plate 16).

In looking at FIGURE 3 it will be noted that the extension member 46 only extends outwardly a distance of about half the length of the blade member 20. However, the distance that the extension member extends outwardly is not critical, and it may be either longer or shorter than the distance shown.

While the drawings show one specific type of extension member that could be used to assist in the removal of a stuck blade from a tree, it will be appreciated that this is by way of illustration only. It is quite clear that once this basic concept has been disclosed and explained to those skilled in the art, they will readily appreciate that a number of variations may be made upon what is specifically disclosed herein and a number of obvious equivalents will suggest themselves. It is therefore to be appreciated that the claim presented here is merely representative of the essence of my concept and I therefore intend to fully rely upon not only the following claims but also the doctrine of equivalents.

What is claimed is:

1. An improved timber shear device comprising in combination:
    (a) a jaw member;
    (b) a blade member;
    (c) said blade being mounted for movement through a limited arc with respect to said jaw member;
    (d) means for moving said blade through said limited arc with respect to said jaw member;
    (e) said blade member having a closed position with respect to said jaw member and an open position with respect to said jaw member;
    (f) said jaw member containing an extension member which is positioned (1) outwardly from said jaw member in a plane that is generally parallel to the plane of said blade member and (2) at an angular disposition that is at an acute angle with respect to the angle of the leading edge of the blade in its closed position;
    (g) whereby, whenever said blade becomes temporarily stuck in the trunk of a tree, said extension member may be utilized by the operator to expedite freeing said blade.

2. In a tree felling unit of the type comprising a fixed jaw member positioned to engage one side of a tree, and a cutting element normally spaced from said jaw member adjacent the side of said tree opposite to said one side and selectively movable from an initial position toward said jaw member for felling a tree oriented between said cutting element and said jaw member as said cutting element is moved from its said initial position through said tree toward said jaw member, the improvement which comprises dislodging means for assisting in freeing said cutting element from said tree in the event that said cutting element should become stuck in said tree during said felling operation, said dislodging means comprising a rigid member positioned to engage said opposite side of said tree, said rigid member being located adjacent said cutting element and being spaced from said jaw member by a fixed distance greater than the distance between said jaw member and the initial position of said cutting element.

3. The tree felling unit of claim 2 wherein said cutting element comprises blade means having an extended cutting edge, said rigid member comprising an elongated structural element extending in a direction generally parallel to the direction of extension assumed by said cutting edge when said cutting element is in its said initial position.

4. The tree felling unit of claim 2 wherein said cutting element comprises blade means mounted for pivotal movement in a plane, said rigid member having a substantially planar face adapted to engage said opposite side of said tree and extending in a plane disposed at substantially right angles to the plane of movement of said blade means.

5. The tree felling unit of claim 4 wherein said rigid member is fixedly attached to a portion of said jaw member at a position above the plane of movement of said blade means.

6. In the known type of tree felling device which includes a blade member that is movable from a retracted position to an extended position, a jaw member which presses against the back side of a tree during the time that the blade is being pushed from its retracted position to an extended position through a tree, means for pushing the blade through the tree, and means for supporting said blade member, jaw member and pushing means on a motorized vehicle, the improvement which comprises a blade dislodging means comprising a strong elongated rigid member which is located a short distance from the retracted position of said blade member and spaced thereabove.

References Cited
UNITED STATES PATENTS

| | | | |
|---|---|---|---|
| 877,764 | 1/1908 | Gahler | 30—250 |
| 3,327,745 | 6/1967 | Meece et al. | 144—34 |
| 3,382,899 | 5/1968 | White | 144—34 |

GERALD A. DOST, Primary Examiner

U.S. Cl. X.R.
30—180